(12) United States Patent
Ashino

(10) Patent No.: US 12,192,219 B2
(45) Date of Patent: Jan. 7, 2025

(54) DATA AGGREGATION APPARATUS, DATA AGGREGATION METHOD, AND PROGRAM

(71) Applicant: NEC Corporation, Tokyo (JP)

(72) Inventor: Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 17/767,145

(22) PCT Filed: Oct. 28, 2020

(86) PCT No.: PCT/JP2020/040378
§ 371 (c)(1),
(2) Date: Apr. 7, 2022

(87) PCT Pub. No.: WO2021/085455
PCT Pub. Date: May 6, 2021

(65) Prior Publication Data
US 2022/0385685 A1    Dec. 1, 2022

(30) Foreign Application Priority Data

Nov. 1, 2019    (JP) ................................ 2019-199697

(51) Int. Cl.
*H04L 9/40* (2022.01)
(52) U.S. Cl.
CPC ............................... *H04L 63/1425* (2013.01)
(58) Field of Classification Search
CPC .................................................. H04L 63/1425
See application file for complete search history.

(56) References Cited

U.S. PATENT DOCUMENTS

| 10,264,003 B1* | 4/2019 | Wu ........................ H04L 43/08 |
| 10,419,449 B1* | 9/2019 | Agranonik .......... H04L 63/1441 |

(Continued)

FOREIGN PATENT DOCUMENTS

| JP | 2003-533925 A | 11/2003 |
| JP | 2008-035266 A | 2/2008 |

(Continued)

OTHER PUBLICATIONS

JP Office Action for JP Application No. 2021-553641, mailed on Mar. 28, 2023 with English Translation.

(Continued)

*Primary Examiner* — Phy Anh T Vu

(57) ABSTRACT

In order to perform data aggregation using an appropriate data aggregation method among a plurality of data aggregation methods used to narrow down candidate data for in-packet analysis from communication data, a data aggregation apparatus 100 includes: an obtaining unit 101 configured to obtain communication data via a communication network; a selecting unit 103 configured to select one or more first data aggregation methods based on user operation, from a plurality of data aggregation methods used to narrow down candidate data for in-packet analysis from the communication data; an aggregating unit 107 configured to perform data aggregation of the communication data, based on the one or more first data aggregation methods; and a display processing unit 109 configured to display, on a screen, an aggregated value related to the data aggregation.

5 Claims, 15 Drawing Sheets

(56) References Cited

U.S. PATENT DOCUMENTS

| | | | |
|---|---|---|---|
| 2004/0015582 A1 | | 1/2004 | Pruthi |
| 2008/0159165 A1 | | 7/2008 | Takara |
| 2016/0205002 A1 | | 7/2016 | Rieke et al. |
| 2017/0034195 A1 | * | 2/2017 | Lee .................... H04L 63/1425 |
| 2017/0063921 A1 | * | 3/2017 | Fridman ............. H04L 63/1466 |
| 2017/0359361 A1 | * | 12/2017 | Modani ............... H04L 63/1416 |
| 2018/0357422 A1 | | 12/2018 | Telang et al. |
| 2020/0302055 A1 | | 9/2020 | Samejima |
| 2021/0124751 A1 | * | 4/2021 | Jennings ................. G06F 9/547 |

FOREIGN PATENT DOCUMENTS

| | | |
|---|---|---|
| JP | 2008-211552 A | 9/2008 |
| JP | 2010-183214 A | 8/2010 |
| JP | 2018-049373 A | 3/2018 |
| WO | 2019/117052 A1 | 6/2019 |

OTHER PUBLICATIONS

International Search Report for PCT Application No. PCT/JP2020/040378, mailed on Jan. 12, 2021.

English translation of Written opinion for PCT Application No. PCT/JP2020/040378, mailed on Jan. 12, 2021.

* cited by examiner

| TIME POINT | TRANSMISSION SOURCE IP | DESTINATION IP | PROTOCOL | TRANSMISSION SOURCE PORT | DESTINATION PORT | PACKET SIZE |
|---|---|---|---|---|---|---|
| xx:yy:11 | 1.1.1.1 | x.x.x.x | UDP/IP | 50541 | 443 | 100 |
| xx:yy:22 | 1.1.2.1 | x.x.x.x | TCP/IP | 9871 | 22 | 140 |
| xx:yy:33 | x.x.x.x | 100.1.1.0 | TCP/IP | 22 | 9871 | 78 |
| xx:yy:44 | 9.8.10.11 | x.x.x.x | ICMP | - | - | 1050 |

| | 401 | 403 | 405 | 407 | 409 |
|---|---|---|---|---|---|
| ID | AGGREGATION NAME | AGGREGATION METHOD NAME | DESCRIPTION OF AGGREGATION PROCESSING | COORDINATE TRANSFORMATION METHOD FOR TRANSFORMATION FROM SCREEN COORDINATE SYSTEM TO AGGREGATED VALUE COORDINATE SYSTEM |
| 0 | TRANSITION OF NUMBER OF PACKETS | NUMBER OF PACKETS PER MINUTE | IMAGE WITH VERTICAL AXIS INDICATING NUMBER OF PACKETS AND HORIZONTAL AXIS INDICATING TIME | TRANSFORM SCREEN COORDINATES BY USING $\left( \dfrac{0}{max(T) - min(T)}, \dfrac{0}{max(Cp)} \right)$ |
| 1 | TRANSITION OF TRANSMISSION SOURCES | NUMBER OF TRANSMISSION SOURCE IP ADDRESSES PER MINUTE | IMAGE WITH VERTICAL AXIS INDICATING NUMBER OF TRANSMISSION SOURCE IP ADDRESSES AND HORIZONTAL AXIS INDICATING TIME | TRANSFORM SCREEN COORDINATES BY USING $\left( \dfrac{0}{max(T) - min(T)}, \dfrac{0}{max(Cs)} \right)$ |
| 2 | FREQUENTLY USED DESTINATION PORT NUMBERS | DESTINATION PORT NUMBERS HAVING 10 LARGEST NUMBERS OF PACKETS | TABLE INDICATING RANKING, DESTINATION PORT NUMBER, AND NUMBER OF PACKETS | DISPLAY PORT NUMBER IN SELECTED ROW |
| 3 | LESS FREQUENTLY USED DESTINATION PORT NUMBERS | DESTINATION PORT NUMBERS HAVING 10 SMALLEST NUMBERS OF PACKETS | TABLE INDICATING RANKING, DESTINATION PORT NUMBER, AND NUMBER OF PACKETS | DISPLAY PORT NUMBER IN SELECTED ROW |

Fig. 4

| MANAGEMENT NO. | DATA AGGREGATION METHOD | NUMBER OF NARROWING-DOWN OPERATIONS |
|---|---|---|
| 1 | TRANSITION OF NUMBER OF PACKETS PER MINUTE | 24 |
| 2 | TRANSITION OF NUMBER OF TRANSMISSION SOURCE IP ADDRESSES PER MINUTE | 0 |
| 3 | DESTINATION PORT NUMBERS HAVING 10 LARGEST NUMBERS OF PACKETS | 0 |
| 4 | DESTINATION PORT NUMBERS HAVING 10 SMALLEST NUMBERS OF PACKETS | 4 |

Fig. 13

DATA AGGREGATION APPARATUS, DATA AGGREGATION METHOD, AND PROGRAM

This application is a National Stage Entry of PCT/JP2020/040378 filed on Oct. 28, 2020, which claims priority from Japanese Patent Application 2019-199697 filed on Nov. 1, 2019, the contents of all of which are incorporated herein by reference, in their entirety.

BACKGROUND

Technical Field

The present invention relates to a data aggregation apparatus, a data aggregation method, and a program that are for performing data aggregation related to communication data via a communication network.

Background Art

A major part of communication data received and recorded via a communication network includes no harmful data such as malware and virus. However, there is a possibility that suspicious activities are included in such communication data that seem to be harmless.

Although it is possible to observe such malicious communication corresponding to suspicious activities, it is not possible to predict which part is to be a target of such communication in advance. This is because what is connected to a communication network such as the Internet is expected to receive malicious communication at any timing.

By analyzing in detail (microscopically) data in packets included in communication data, it is possible to judge whether the communication relates to an attack. Performing such "micro analysis" on all packets requires an enormous amount of time and is hence not realistic.

For example, PTL 1 describes performing data aggregation of communication data, based on a predetermined aggregation policy, to narrow down a range to which micro analysis is applied.

CITATION LIST

Patent Literature

[PTL 1] WO 2019/117052

SUMMARY

Technical Problem

However, it is not clear, in a case where there exist a plurality of data aggregation methods as that described in PTL 1 described above, which data aggregation method is appropriate for finding suspicious activities. In particular, since an aggregation result is different for each data aggregation method, it is difficult to grasp the characteristics of individual data aggregation methods.

An example object of the present invention is to provide a data aggregation apparatus, a data aggregation method, and a program that enable data aggregation using an appropriate data aggregation method among a plurality of data aggregation methods used to narrow down candidate data for in-packet analysis from communication data.

Solution to Problem

According to an aspect of the present invention, a data aggregation apparatus includes: an obtaining unit configured to obtain communication data via a communication network; a selecting unit configured to select one or more first data aggregation methods based on user operation, from a plurality of data aggregation methods used to narrow down candidate data for in-packet analysis from the communication data; an aggregating unit configured to perform data aggregation of the communication data, based on the selected one or more first data aggregation methods; and a display processing unit configured to display, on a screen, an aggregated value related to the data aggregation.

According to an aspect of the present invention, a data aggregation method includes: obtaining communication data via a communication network; selecting one or more first data aggregation methods based on user operation, from a plurality of data aggregation methods used to narrow down candidate data for in-packet analysis from the communication data; performing data aggregation of the communication data, based on the one or more first data aggregation methods; and displaying, on a screen, an aggregated value related to the data aggregation.

An aspect of the present invention, a program causes a processor to perform processing including: obtaining communication data via a communication network; selecting one or more first data aggregation methods based on user operation, from a plurality of data aggregation methods used to narrow down candidate data for in-packet analysis from the communication data; performing data aggregation of the communication data, based on the one or more first data aggregation methods; and a display processing unit configured to display, on a screen, an aggregated value related to the data aggregation.

Advantageous Effects of Invention

According to an aspect of the present invention, it is possible to perform data aggregation using an appropriate data aggregation method among a plurality of data aggregation methods used to narrow down candidate data for in-packet analysis from communication data. Note that, according to the present invention, instead of or together with the above effects, other effects may be exerted.

BRIEF DESCRIPTION OF THE DRAWINGS

FIG. 3 is a diagram illustrating a concrete example of communication data 300 obtained by the obtaining unit 101;

FIG. 4 is a diagram illustrating a concrete example of a plurality of data aggregation methods managed in a data aggregation method table 105;

FIG. 13 is a diagram illustrating a concrete example of a narrowing-down operation number management table 1300 obtained by management by a narrowing-down operation number managing unit 115;

DESCRIPTION OF THE EXAMPLE EMBODIMENTS

Figure 1:
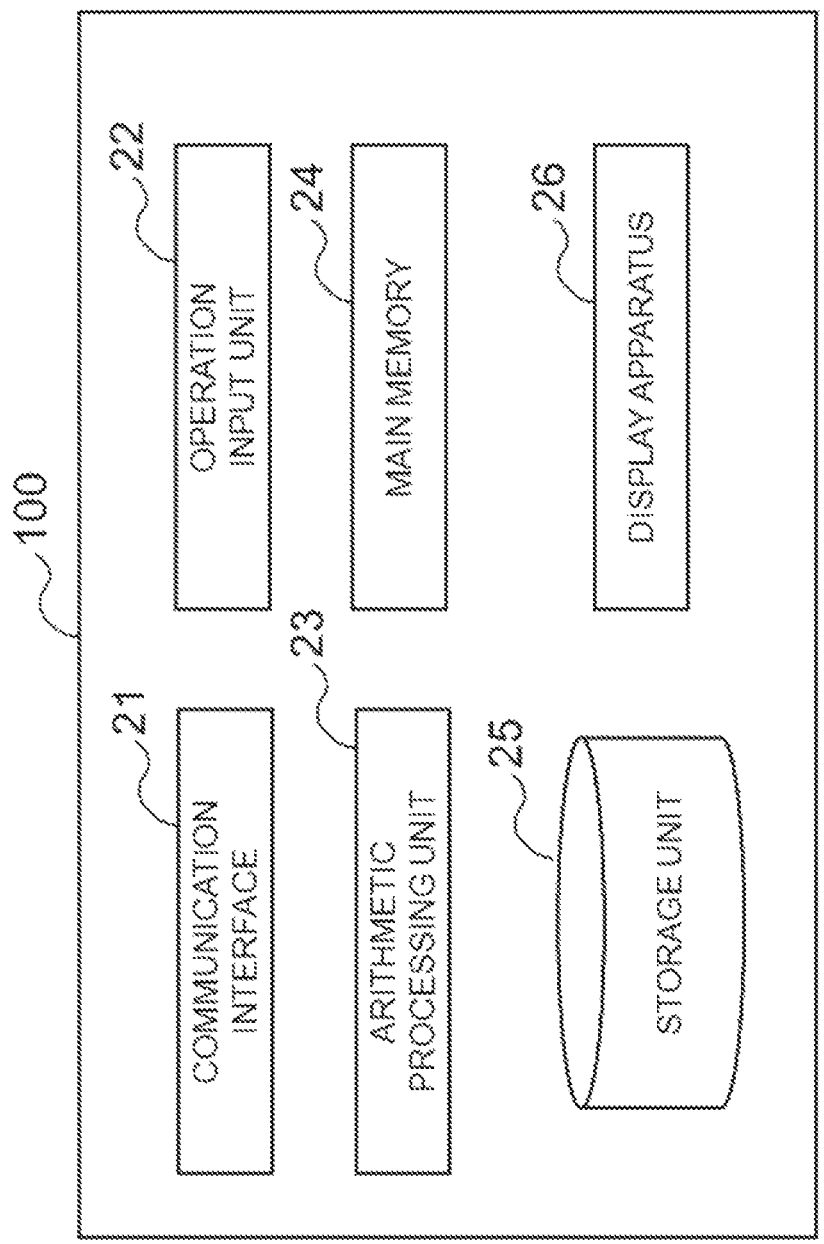
FIG. 1 is a block diagram illustrating an example of a hardware configuration of a data aggregation apparatus 100 according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. First Example Embodiment
    2.1. Configuration of Data Aggregation Apparatus 100
    2.2. Operation Example
3. Second Example Embodiment
    3.1. Configuration of Data Aggregation Apparatus 200
    3.2. Operation Example
4. Third Example Embodiment
    4.1. Configuration of Data Aggregation Apparatus 500
    4.2. Operation Example
5. Other Example Embodiments

1. Overview of Example Embodiments of the Present Invention

First, an overview of example embodiments of the present invention will be described.
(1) Technical Issues A major part of communication data received and recorded via a communication network includes no harmful data such as malware and virus. However, there is a possibility that suspicious activities are included in such communication data that seem to be harmless.

Although it is possible to observe such malicious communication corresponding to suspicious activities, it is not possible to predict which part is to be a target of such communication in advance. This is because what is connected to a communication network such as the Internet is expected to receive malicious communication at any timing.

By analyzing in detail (microscopically) data in packets included in communication data, it is possible to judge whether the communication relates to an attack. Performing such "micro analysis" on all packets requires an enormous amount of time and is hence not realistic.

For example, by performing data aggregation of communication data, based on a predetermined aggregation policy, it is possible to narrow down a range to which micro analysis is applied. However, it is not clear, in a case where there exist a plurality of data aggregation methods described above, which data aggregation method is appropriate for finding suspicious activities. In particular, since an aggregation result is different for each data aggregation method, it is difficult to grasp the characteristics of individual data aggregation methods.

In view of these, an example object of the present example embodiments is to perform data aggregation using an appropriate data aggregation method among a plurality of data aggregation methods used to narrow down candidate data for in-packet analysis from communication data.
(2) Technical Features In example embodiments of the present invention, communication data is obtained via a communication network, one or more first data aggregation methods based on user operation are selected from a plurality of data aggregation methods used to narrow down candidate data for in-packet analysis, data aggregation of the communication data is performed based on the one or more first data aggregation methods, and an aggregated value related to the data aggregation is displayed on a screen.

With this, it is possible, for example, to perform data aggregation using an appropriate data aggregation method among a plurality of data aggregation methods used to narrow down candidate data for in-packet analysis from communication data. Note that the above-described technical features are concrete examples of the example embodiments of the present invention, and the example embodiments of the present invention are, of course, not limited to the above-described technical features.

2. First Example Embodiment

A description will be given of a first example embodiment to which the present invention is applied, with reference to FIGS. 1 to 10.

2.1. Configuration of Data Aggregation Apparatus 100

FIG. 1 is a block diagram illustrating an example of a hardware configuration of a data aggregation apparatus 100 according to the first example embodiment. With reference to FIG. 1, the data aggregation apparatus 100 includes a communication interface 21, an operation input unit 22, an arithmetic processing unit 23, a main memory 24, a storage unit 25, and a display apparatus 26.

The communication interface 21 transmits and/or receives data to and/or from an external apparatus. For example, the communication interface 21 communicates with the external apparatus via a wired communication path.

The operation input unit 22 is an input interface that performs input processing for an operation request from a user operating the data aggregation apparatus 100.

The arithmetic processing unit 23 is, for example, a central processing unit (CPU), a graphics processing unit (GPU), or the like. The main memory 24 is, for example, a random access memory (RAM), a read only memory (ROM), or the like. The storage unit 25 is, for example, a hard disk drive (HDD), a solid state drive (SSD), a memory card, or the like. The storage unit 25 may be a memory such as a RAM or a ROM.

The display apparatus 26 is an apparatus, such as a liquid crystal display (LCD), a cathode ray tube (CRT) display, or a monitor, that displays a screen corresponding to drawing data subject to processing by the arithmetic processing unit 23.

Figure 2:
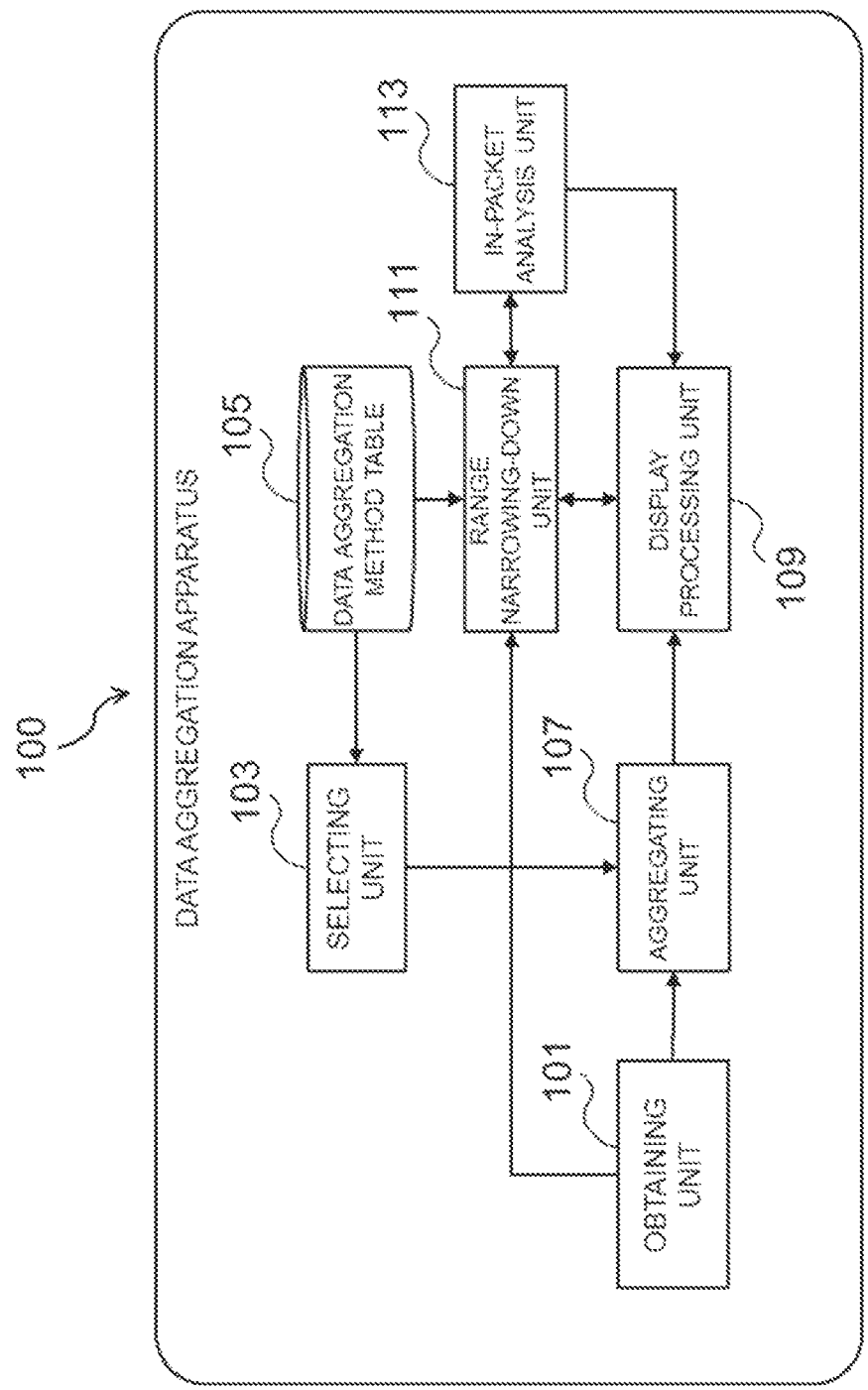
FIG. 2 is a block diagram illustrating an example of a functional configuration implemented by the data aggregation apparatus 100.

The data aggregation apparatus 100, for example, reads out programs for data aggregation processing stored in the storage unit 25, to the main memory 24, and executes the programs by the arithmetic processing unit 23, to thereby implement the functional units as those illustrated in FIG. 2. The data aggregation apparatus 100 may first read out programs to the main memory 24 for execution or may execute the programs without reading out the programs to the main memory 24. The main memory 24 and the storage unit 25 also play roles in storing information and data held by the constituent elements included in the data aggregation apparatus 100.

The above-described programs can be stored by using various types of non-transitory computer readable media to be provided to a computer. The non-transitory computer readable media include various types of tangible recording media (tangible storage media). Examples of the non-transitory computer readable media include magnetic recording medium (for example, a flexible disk, a magnetic tape, and a hard disk drive), a magneto-optical recording medium (for example, a magneto-optical disk), a compact disc-ROM (CD-ROM), a CD-recordable (CD-R), a CD-rewritable (CD-R/W), a semiconductor memory (for example, a mask ROM and a programmable ROM (PROM)), an erasable PROM (EPROM), and a flash ROM and RAM. The programs may be provided to a computer by various types of transitory computer readable media. Examples of the transitory computer readable media include an electric signal, an optical signal, and an electromagnetic wage. The transitory computer readable media can provide the programs to a computer through wired communication paths, such as electric wires and optical fibers, or wireless channels.

FIG. 2 is a block diagram illustrating an example of a functional configuration implemented by the data aggregation apparatus 100.

With reference to FIG. 2, the data aggregation apparatus 100 includes an obtaining unit 101, a selecting unit 103, a data aggregation method table 105, an aggregating unit 107, a display processing unit 109, a range narrowing-down unit 111, and an in-packet analysis unit 113. Concrete operation and processing of each of these function units will be described later.

2.2. Operation Example

Next, an operation example of the first example embodiment will be described.

According to the first example embodiment, the data aggregation apparatus 100 (the obtaining unit 101) obtains communication data via a communication network. The data aggregation apparatus 100 (the selecting unit 103) selects one or more first data aggregation methods based on user operation from a plurality of data aggregation methods used to narrow down candidate data for in-packet analysis from the communication data. The data aggregation apparatus 100 (the aggregating unit 107) performs data aggregation of the communication data, based on the one or more first data aggregation methods. The data aggregation apparatus 100 (the display processing unit 109) displays, on a screen (the display apparatus 26), an aggregated value related to the data aggregation.

(1) Communication Data

FIG. 3 is a diagram illustrating a concrete example of communication data 300 obtained by the obtaining unit 101. With reference to FIG. 3, in a case that the communication data 300 is received from a communication network (e.g., the Internet or a local network), for example, the obtaining unit 101 obtains, as detailed information related to the communication data 300, information such as a reception time point 301, a transmission source IP address 303, a destination IP address 305, a protocol 307, a transmission source port number 309, a destination port number 311, and a packet size 313.

(2) Data Aggregation Method

For example, the selecting unit 103 selects one or more first data aggregation methods based on user operation with reference to a plurality of data aggregation methods managed in the data aggregation method table 105.

FIG. 4 is a diagram illustrating a concrete example of the plurality of data aggregation methods managed in the data aggregation method table 105.

With reference to FIG. 4, the data aggregation method table 105 manages, while associating with each other, an ID 401 identifying a data aggregation method, an aggregation name 403, an aggregation method name 405, a description of aggregation processing 407, and a coordinate transformation method for transformation from a screen coordinate system to an aggregated value coordinate system 409.

For example, the data aggregation method identified by ID "1" is a method for aggregating transition of the number of packets per minute, and displays, as an aggregation result, an image with the vertical axis indicating the number of packets and the horizontal axis indicating time, for example. In the data aggregation method identified by ID "1", screen coordinates are transformed into aggregated value coordinates by using a coordinate transformation matrix represented by an expression as that presented below.

$$\begin{pmatrix} \max(T) - \min(T) & 0 \\ 0 & \max(Cp) \end{pmatrix} \qquad \text{[Math. 1]}$$

Here, max(T) denotes the last communication time point of communication data, min(T) denotes the first communication time point of the communication data, and max(Cp) denotes the upper limit of the number of packets possible for an aggregated value.

For example, the data aggregation method identified by ID "2" is a method for aggregating transition of transmission sources per minute, and displays, as an aggregation result, an image with the vertical axis indicating the number of transmission source IP addresses and the horizontal axis indicating time, for example. In the data aggregation method identified by ID "2", screen coordinates are transformed into aggregated value coordinates by using a coordinate transformation matrix represented by an expression as that presented below.

$$\begin{pmatrix} \max(T) - \min(T) & 0 \\ 0 & \max(Cs) \end{pmatrix} \qquad \text{[Math. 2]}$$

Here, max(T) denotes the last communication time point of communication data, min(T) denotes the first communication time point of the communication data, and max(Cs) denotes the upper limit of the number of transmission source IP addresses possible for an aggregated value.

For example, the data aggregation method identified by ID "3" is a method for aggregating destination port numbers having the 10 largest numbers of packets, and displays, as an aggregation result, a table including ranking, destination port number, and the number of packets, for example. In the data aggregation method identified by ID "3", the port number corresponding to the ranking selected based on user operation is displayed.

For example, the data aggregation method identified by ID "4" is a method for aggregating destination port numbers having the 10 smallest numbers of packets, and displays, as an aggregation result, a table including ranking, destination port number, and the number of packets, for example. In the data aggregation method identified by ID "4", the port number corresponding to the ranking selected based on user operation is displayed.

Concrete Example

Next, a description will be given of a concrete example of a result of aggregation according to the data aggregation method identified by ID "1" among the data aggregation methods illustrated in FIG. 4.

Figure 5:
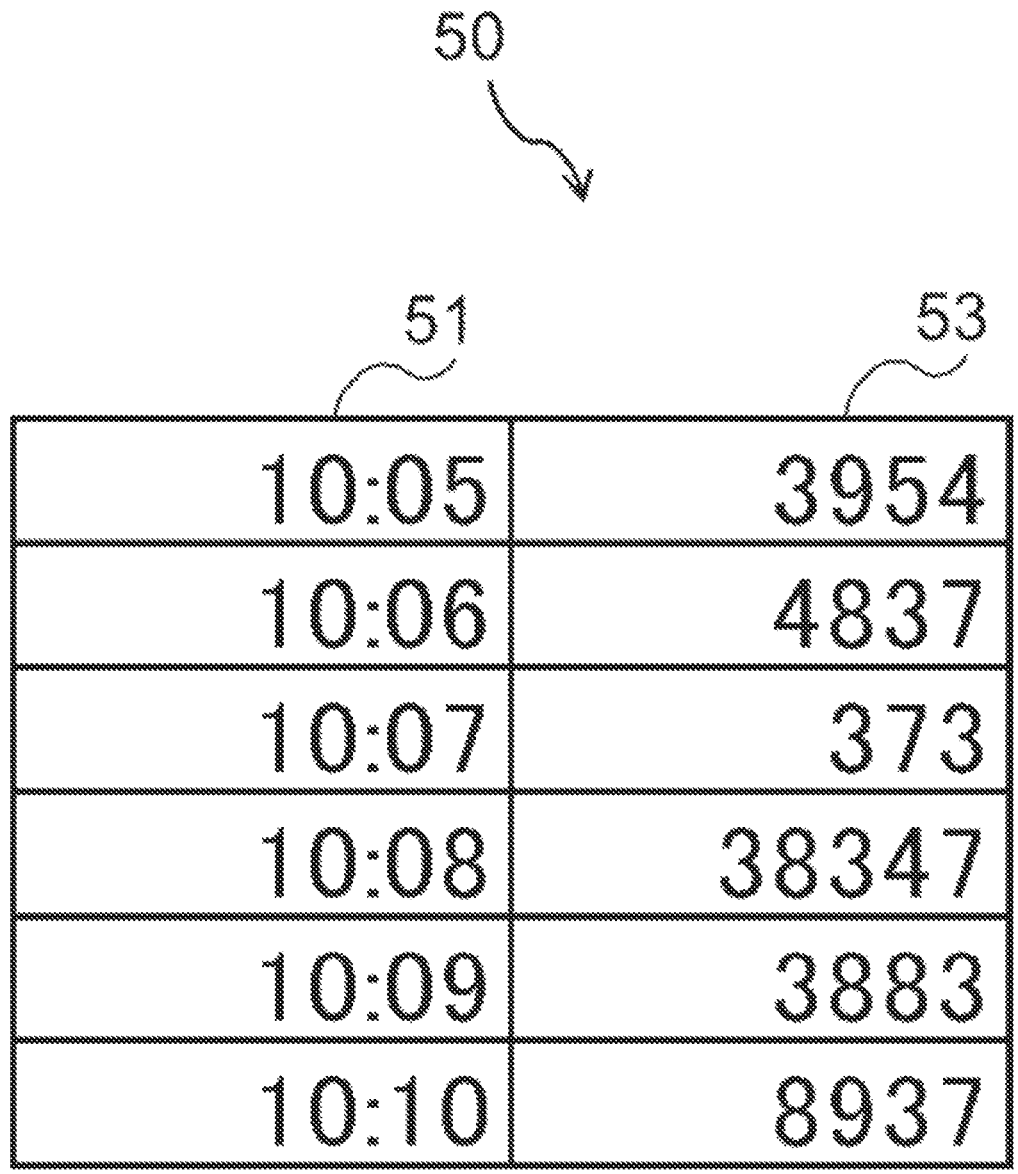
FIG. 5 is a diagram illustrating an example of an aggregation result 50 obtained by aggregating, by minutes, transition of the number of packets included in communication data.

FIG. 5 is a diagram illustrating an example of an aggregation result 50 obtained by aggregating, by minutes, transition of the number of packets included in communication data. With reference to FIG. 5, the aggregation result 50 is constituted of a column 51 indicating time points by minutes and a column 53 indicating the numbers of packets, for example.

To display, on a screen, a graph corresponding to the aggregation result 50, the display processing unit 109 uses a coordinate transformation matrix as that presented below, to transform screen coordinates representing the upper left corner with the origin (0, 0) and the lower right corner with (1.0, 1.0) into graph coordinates.

With reference to FIG. 4, the coordinate transformation matrix is given by the following expression.

$$\begin{pmatrix} \max(T) - \min(T) & 0 \\ 0 & \max(Cp) \end{pmatrix} \quad \text{[Math. 3]}$$

Figure 6:
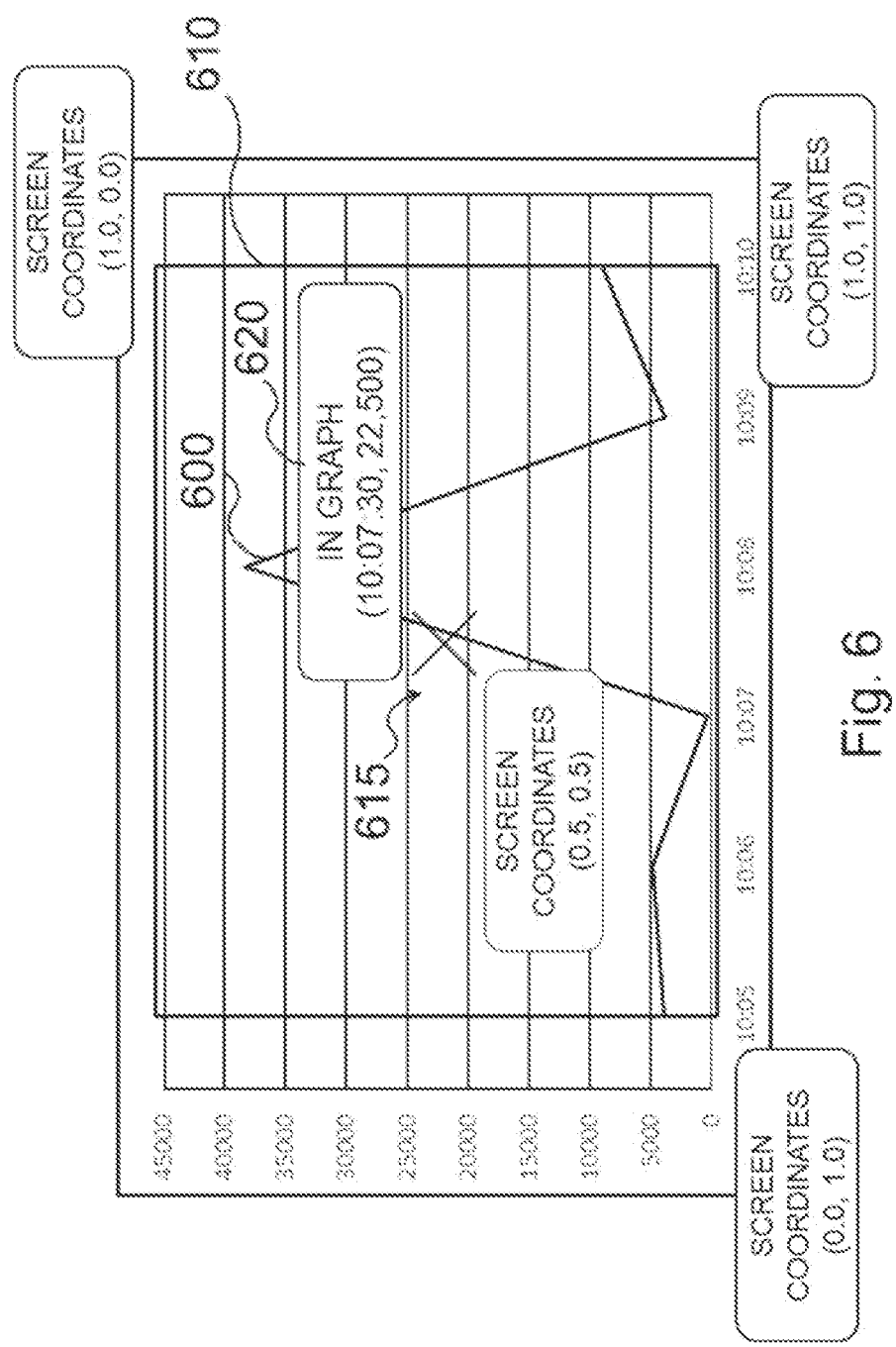
FIG. 6 is a diagram illustrating an example of a line graph 600 corresponding to the aggregation result 50 illustrated in FIG. 5.

Here, with reference to FIGS. 5 and 6, a time point 10:10 is input to max(T), a time point 10:05 is input to min(T), and 45,000 is input to max(Cp) as the upper limit of the number of packets possible for a line graph 600.

In this way, for example, graph coordinates (aggregated value coordinates) corresponding to (0.5, 0.5), which is the median of the screen coordinates, are transformed to (2.5, 25000) according to the following equation.

$$(0.5 \ 0.5) \begin{pmatrix} 5 & 0 \\ 0 & 45{,}000 \end{pmatrix} = (2.5 \ 22{,}500) \quad \text{[Math. 4]}$$

The display processing unit 109 uses a coordinate transformation function associated with the data aggregation method, to transform the screen coordinates to the graph coordinates (coordinates of an aggregated value related to data aggregation). The display processing unit 109 then maps each of the aggregated values of the aggregation result 50 into a graph coordinate system to thereby be able to create a line graph with the vertical axis indicating the number of packets and the horizontal axis indicating time. FIG. 6 is a diagram illustrating an example of the line graph 600 corresponding to the aggregation result 50 illustrated in FIG. 5.

For example, in a case that a center point 615 of the screen 610 as illustrated in FIG. 6 by user operation, the display processing unit 109 performs processing for displaying, on a screen 610, an image 620 indicating graph coordinates (10:07:30, 22500), for example. By the image 620 described above being displayed on the screen 610, a user can easily select, while recognizing an aggregation result, a range (aggregated value range) to narrow down candidate data for in-packet analysis from the communication data.

(3) Concrete Flow of Processing

Figure 7:
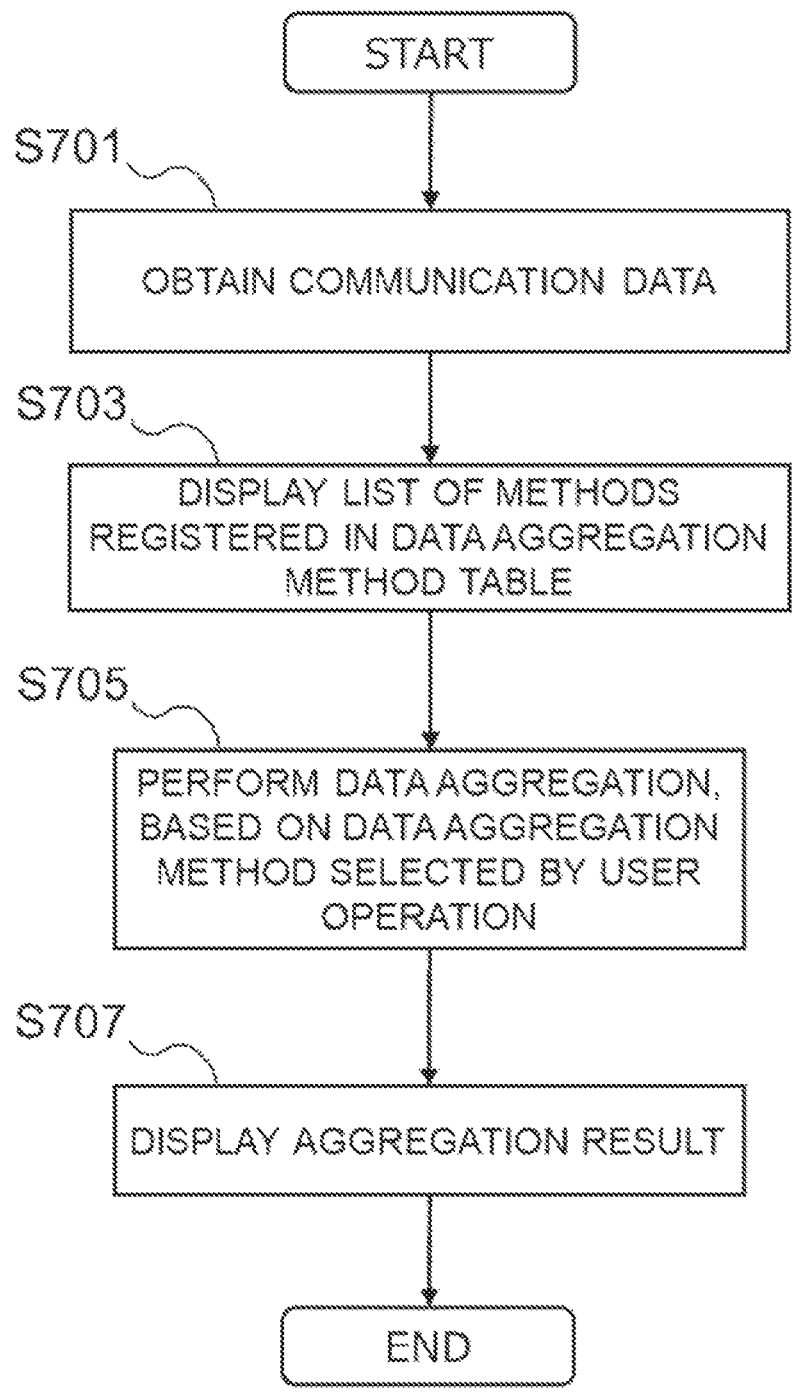
FIG. 7 is a flowchart for describing a concrete flow of processing according to the first example embodiment.

Next, a concrete flow of processing according to the first example embodiment will be described with reference to FIG. 7 and the like. FIG. 7 is a flowchart for describing the concrete flow of the processing according to the first example embodiment.

Figure 8:
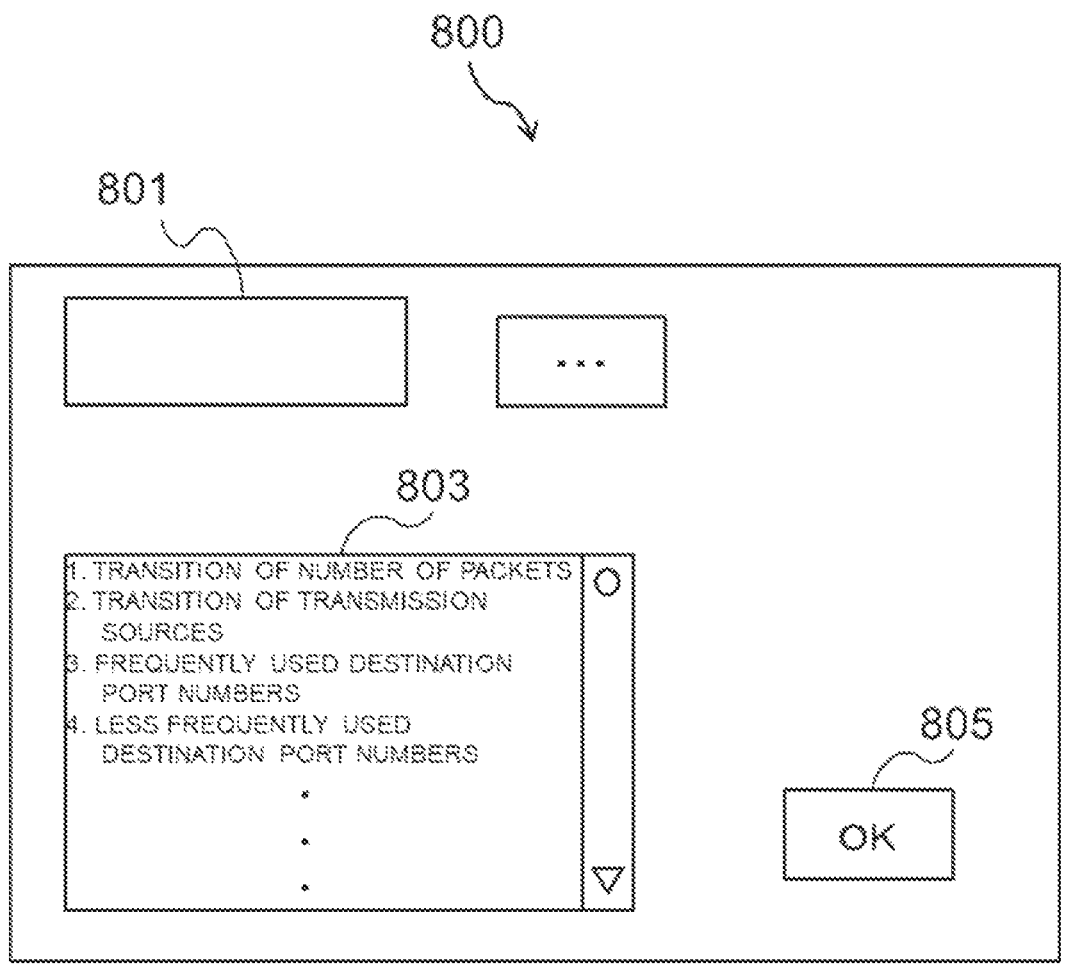
FIG. 8 is a diagram illustrating a concrete example of an operation screen 800 for receiving user operation.

In step S701, the obtaining unit 101 obtains communication data according to user operation performed by following an operation screen 800 illustrated in FIG. 8, for example. FIG. 8 is a diagram illustrating a concrete example of the operation screen 800 for receiving user operation. For example, when storage place information of communication data stored in the storage unit 25 is input to an image region 801 according to user operation, the obtaining unit 101 accesses the storage unit 25 to thereby obtain the communication data.

In step S703, the display processing unit 109 displays, for example, on the operation screen 800, a method list image 803 managed in the data aggregation method table 105.

In step S705, the aggregating unit 107 performs data aggregation, based on the data aggregation method selected by the user operation. For example, when a data aggregation method is selected from the method list image 803 and operation is performed on a confirmation key 805, according to the operation screen 800 illustrated in FIG. 8, the aggregating unit 107 performs data aggregation, based on the selected data aggregation method.

In step S707, the display processing unit 109 displays information related to an aggregation result obtained by the data aggregation method, as illustrated in FIG. 6 described above, for example.

According to the processing illustrated in FIG. 7 described above, for example, an aggregation result based on the first data aggregation method selected according to the user operation is displayed. With this, the user can, while checking the aggregation result, examine to what range to narrow down data, and consider whether or not to perform detailed analysis, i.e., in-packet analysis, on the data thus narrowed down.

(4) Switching Display of Plurality of Aggregation Results

For example, the selecting unit 103 may select two or more data aggregation methods as the first data aggregation method according to user operation. In this case, for example, the display processing unit 109 may perform switching display of the aggregated values related to two or more cases of data aggregation based on the two or more data aggregation methods, to display the aggregated value for each of the data aggregation methods in a switching manner.

Figure 9:
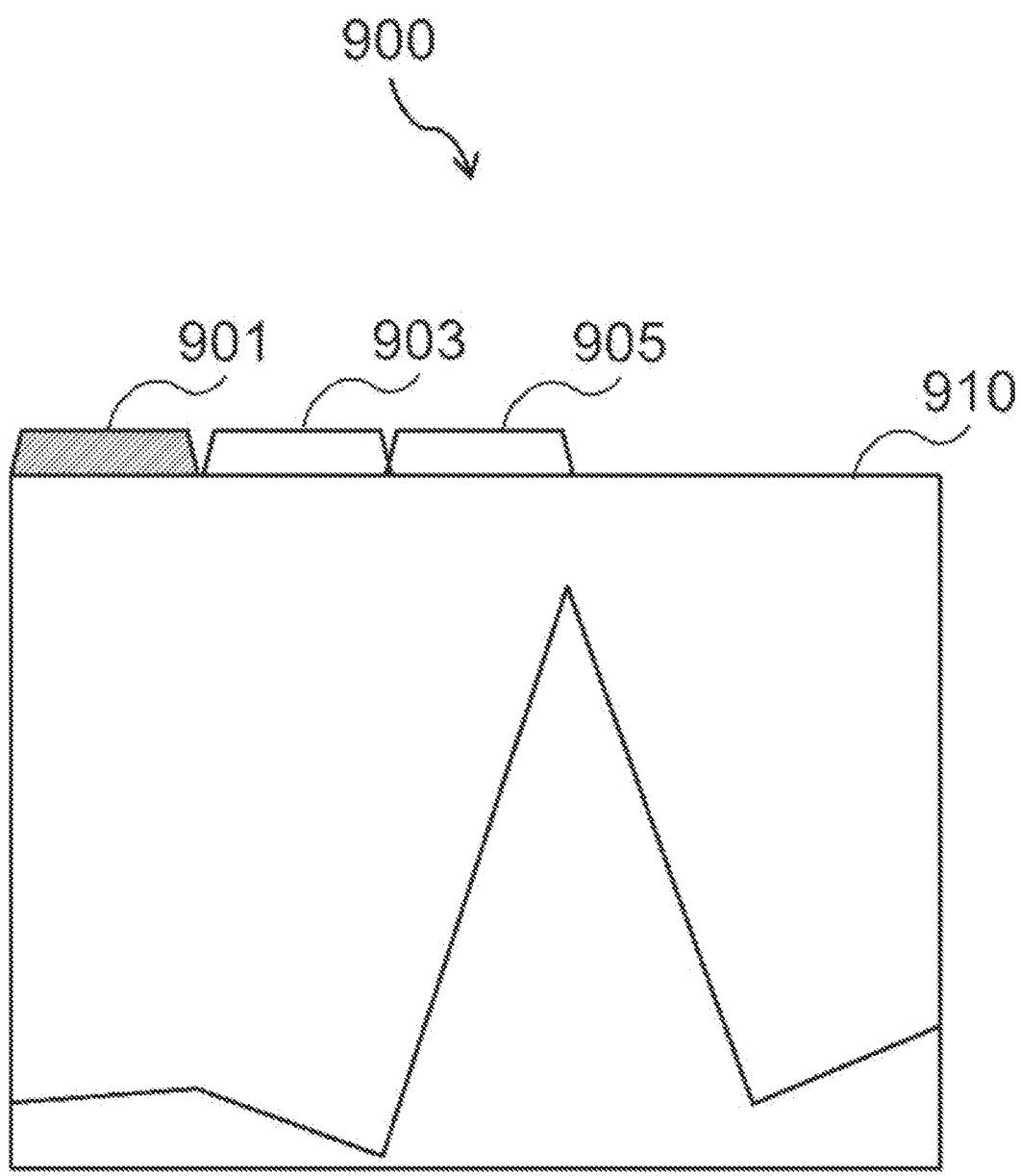
FIG. 9 is a diagram illustrating an image example for performing switching display for each data aggregation method.

FIG. 9 is a diagram illustrating an image example for performing the switching display for each data aggregation method. For example, in an aggregation image 900 for switching display illustrated in FIG. 9, any one of three tabs 901, 903, and 905 in an upper part of the screen is selected by user operation, and an aggregated value related to the selected data aggregation method is displayed in a display region 910.

(5) Operation of Narrowing Down Aggregation Result

Figure 10:
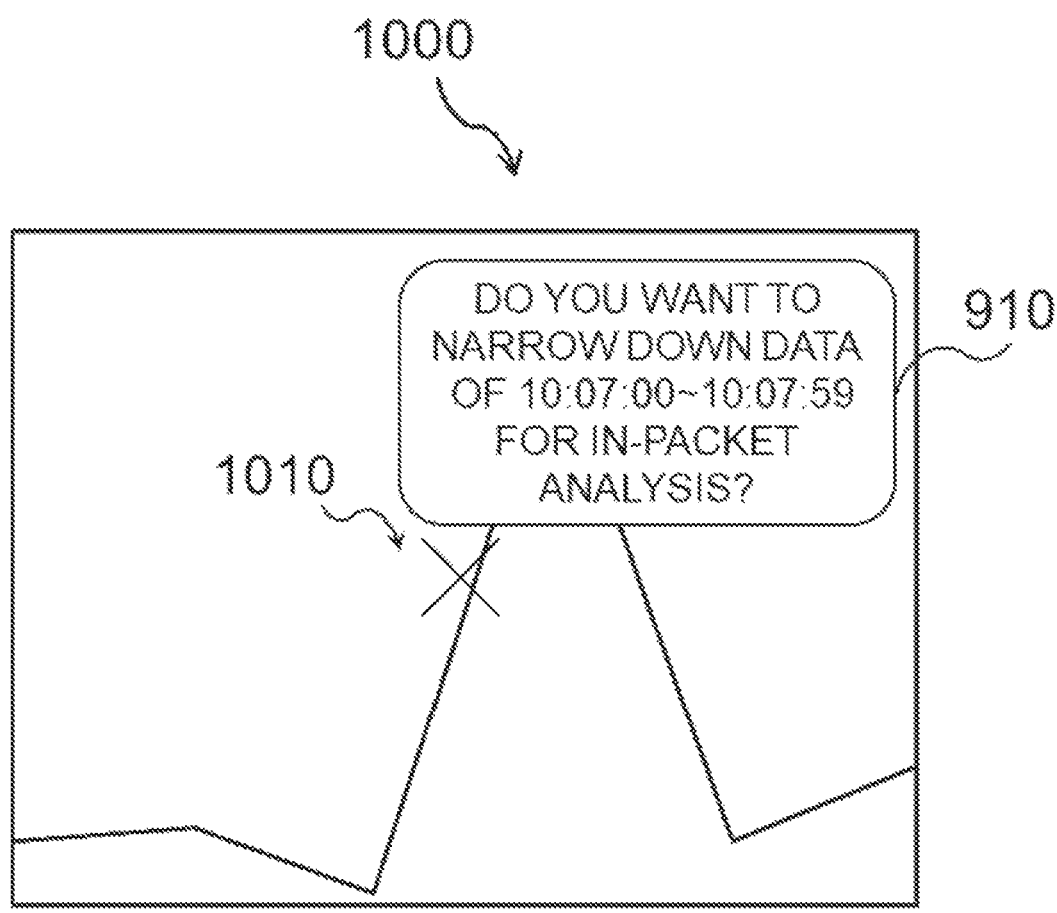
FIG. 10 is a diagram illustrating a display example of a screen 1000 for encouraging user operation of narrowing down an aggregated value range.

The display processing unit 109 may display a screen for encouraging user operation of narrowing down aggregated values related to data aggregation, to an aggregated value range including candidate data for in-packet analysis. For example, FIG. 10 is a diagram illustrating a display example of a screen 1000 for encouraging user operation of narrowing down an aggregated value range. With reference to FIG. 10, for example, when user operation indicates a median 1010 or thereabout in an aggregated value coordinate system, the display processing unit 109 displays an operation image 1020 encouraging narrowing down of data to data included in the aggregated value range of communication performed from a time point 10:07:00 to a time point 10:07:59:00 related to the median 1010, as candidate data for in-packet analysis.

Subsequently, when user operation according to the above-described operation image 1020 is performed, the range narrowing-down unit 111 narrows down communication data to communication data communicated from a time point 10:07:00 to a time point 10:07:59:00, for example. The in-packet analysis unit 113 then performs in-packet analysis on the packets in the range obtained by narrowing down by the range narrowing-down unit 111.

In this way, the data aggregation apparatus 100 can appropriately narrow down an enormous amount of communication data to communication data on which in-packet analysis is performed, which enables efficient in-packet analysis without imposing excessive processing load on the apparatus.

3. Second Example Embodiment

A description will be given of a second example embodiment to which the present invention is applied, with reference to FIGS. 11 to 14.

3.1. Configuration of Data Aggregation Apparatus 200

Figure 11:
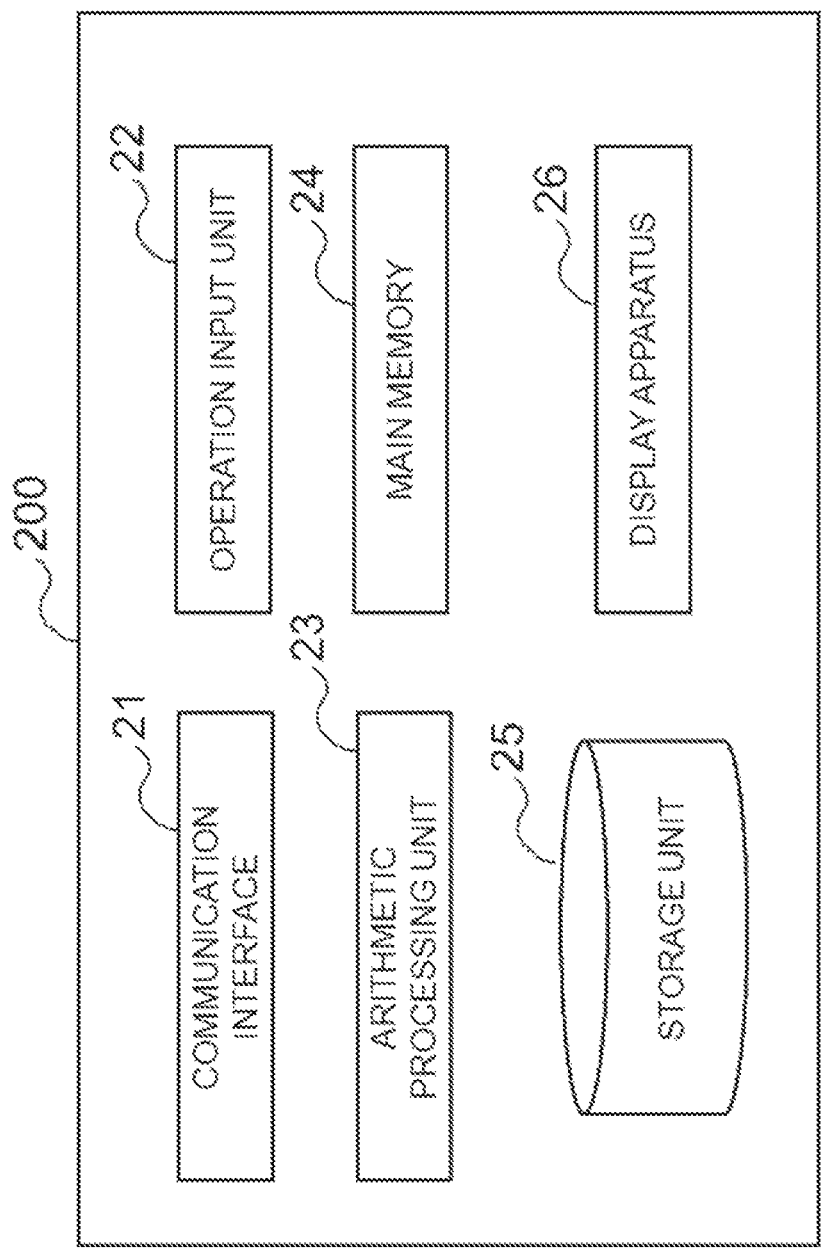
FIG. 11 is a block diagram illustrating an example of a hardware configuration of a data aggregation apparatus 200 according to the first example embodiment.

FIG. 11 is a block diagram illustrating an example of a hardware configuration of a data aggregation apparatus 200 according to the second example embodiment. With reference to FIG. 11, the data aggregation apparatus 200, as the data aggregation apparatus 100 according to the first example embodiment described above, for example, includes the communication interface 21, the operation input unit 22, the arithmetic processing unit 23, the main memory 24, the storage unit 25, and the display apparatus 26. The constituent elements illustrated in FIG. 11, which are similar to those of the hardware configuration of the data aggregation apparatus 100 illustrated in FIG. 1 described above, are denoted by similar reference signs to those of the data aggregation apparatus 100, and hence have descriptions being omitted.

Figure 12:
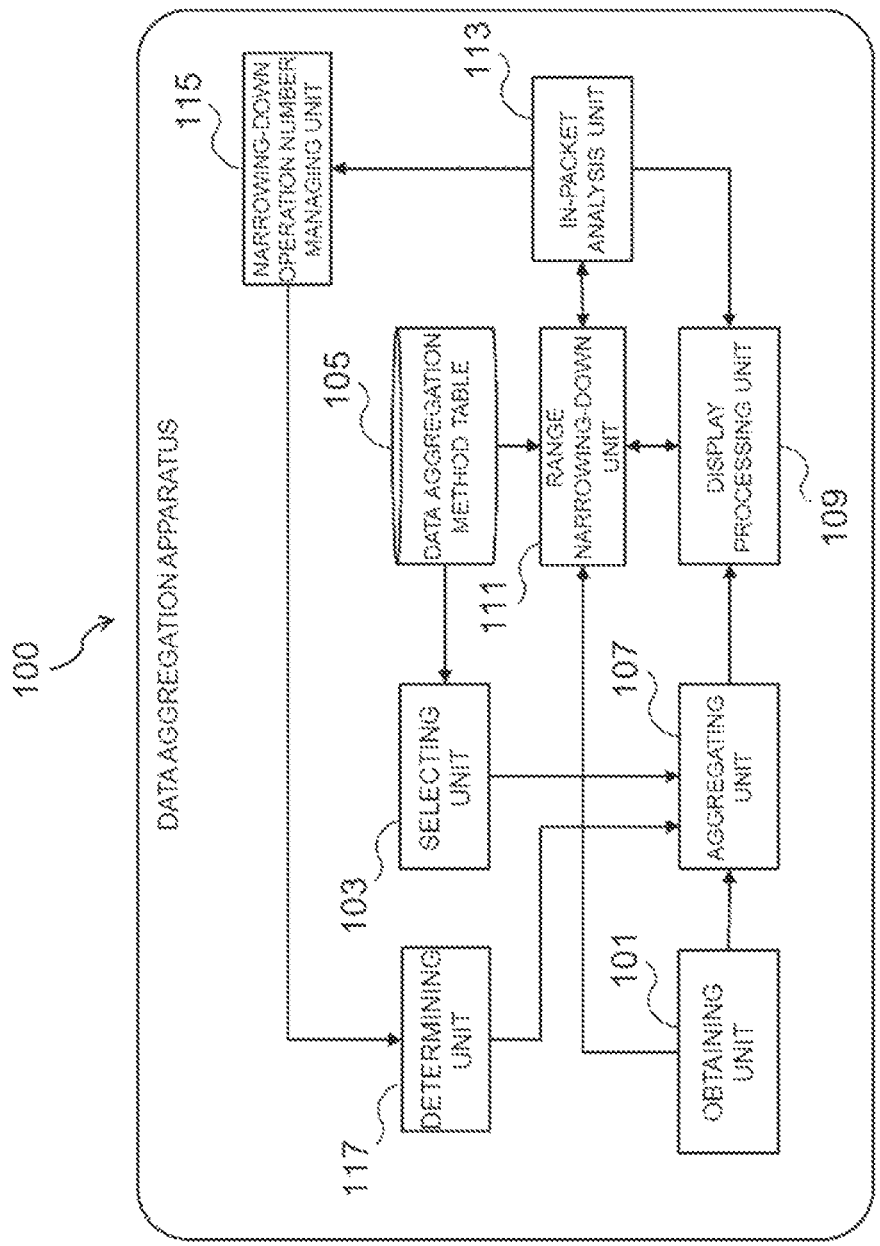
FIG. 12 is a block diagram illustrating an example of a functional configuration implemented by the data aggregation apparatus 200.

FIG. 12 is a block diagram illustrating an example of a functional configuration implemented by the data aggregation apparatus 200.

With reference to FIG. 12, the data aggregation apparatus 200, as the data aggregation apparatus 100 according to the first example embodiment described above, includes the obtaining unit 101, the selecting unit 103, the data aggregation method table 105, the aggregating unit 107, the display processing unit 109, the range narrowing-down unit 111, and the in-packet analysis unit 113. The data aggregation apparatus 200 further includes a narrowing-down operation number managing unit 115 and a determining unit 117. Concrete operation and processing of each of these function units will be described later.

3.2. Operation Example

Next, an operation example of the second example embodiment will be described.

According to the second example embodiment, the data aggregation apparatus 200 (the narrowing-down operation number managing unit 115) manages the number of operations of narrowing down candidate data for in-packet analysis based on data aggregation in each of a plurality of data aggregation methods. The data aggregation apparatus 200 (the determining unit 117) determines one or more second data aggregation methods based on the number of operations of narrowing down candidate data for in-packet analysis, from among the plurality of data aggregation methods. The data aggregation apparatus 200 (the aggregating unit 107) performs data aggregation of communication data, based on the one or more second data aggregation methods. An aggregated value related to data aggregation is displayed on the screen (the display apparatus 26) by the display processing unit 109, for example.

(1) Management of Number of Narrowing-Down Operations

FIG. 13 is a diagram illustrating a concrete example of a narrowing-down operation number management table 1300 obtained by management by the narrowing-down operation number managing unit 115. With reference to FIG. 13, the narrowing-down operation number management table 1300 manages a management number 1301 managing the type of data aggregation method, detailed information of the data aggregation method 1303, and the number of narrowing-down operations 1305 of narrowing down candidate data for in-packet analysis based on data aggregation in the data aggregation method, in association with each other.

For example, assume a case where, in the data aggregation apparatus 200, the data aggregation method of "transition of the number of packets per minute" is selected by user operation, narrowing down is performed on an aggregated value related to data aggregation based on the data aggregation method by user operation, to narrow down an aggregated value range, and in-packet analysis is performed on the aggregated value range. In this case, in the example of the narrowing-down operation number management table 1300 illustrated in FIG. 13, the number of narrowing-down operations 1305 is updated from 24 to 25.

In this way, the narrowing-down operation number managing unit 115 can learn a data aggregation method appropriate for data aggregation, based on user operation.

Figure 14:
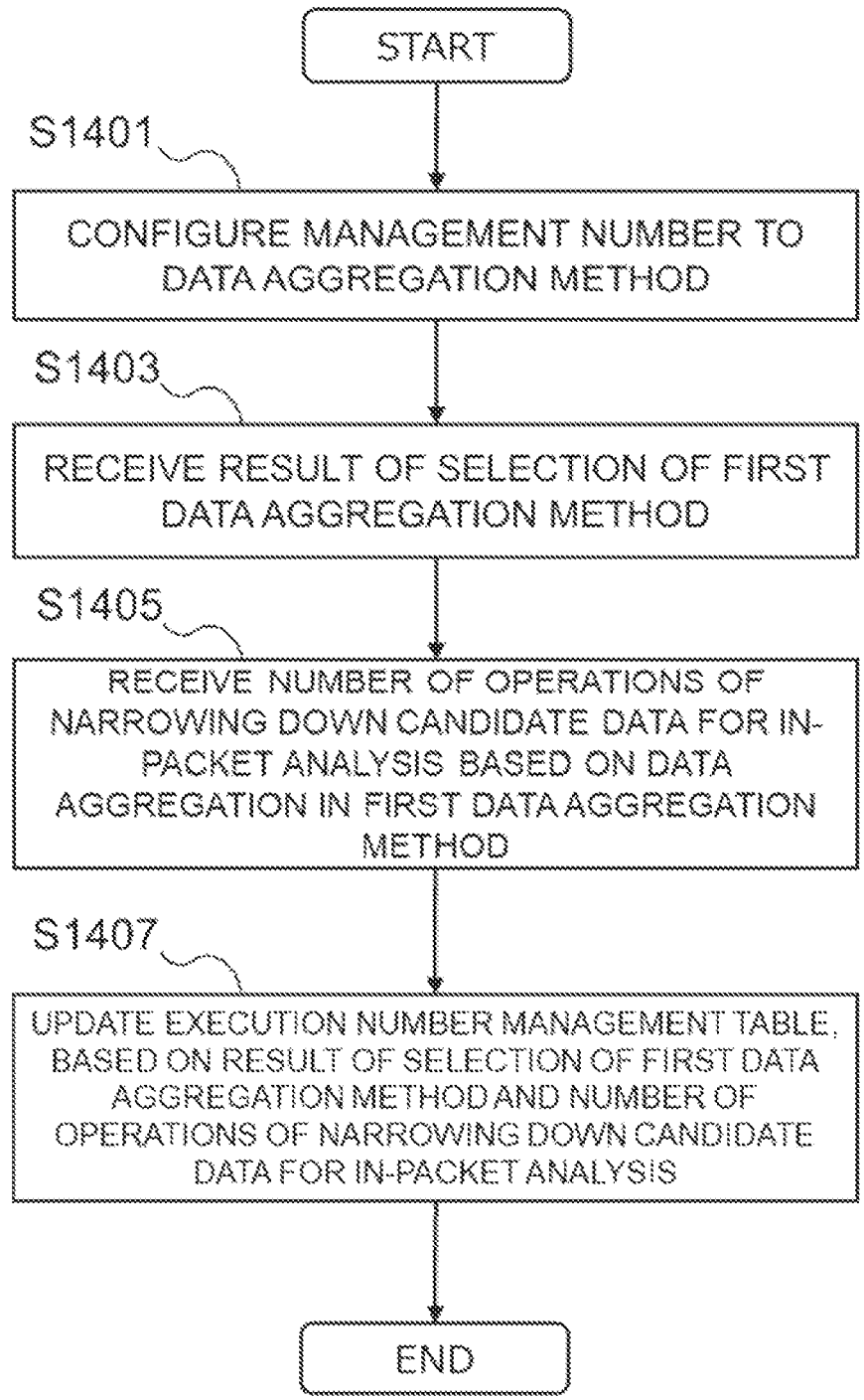
FIG. 14 is a flowchart illustrating a flow of learning processing for data included in the narrowing-down operation number management table 1300.

FIG. 14 is a flowchart illustrating a flow of learning processing for data included in the narrowing-down operation number management table 1300.

With reference to FIG. 14, in step S1401, the narrowing-down operation number managing unit 115 configures a management number 1301 to each data aggregation method to be managed.

In step S1403, the narrowing-down operation number managing unit 115 receives a result of selection of a first data aggregation method selected by the selecting unit 103.

In step S1405, the narrowing-down operation number managing unit 115 receives, from the in-packet analysis unit 113, the number of operations of narrowing down candidate data for in-packet analysis based on data aggregation in the first data aggregation method selected in step S1403.

In step S1407, the narrowing-down operation number managing unit 115 updates the narrowing-down operation number management table 1300, based on the result of the selection of the first data aggregation method and the number of operations of narrowing down candidate data for in-packet analysis, and terminates the processing illustrated in FIG. 14.

(User-Based Management)

The narrowing-down operation number managing unit 115 may manage, for each of two or more users, the number of operations of narrowing down candidate data for in-packet analysis based on each of the plurality of data aggregation methods. This is because a method to be selected, the number of narrowing-down operations, and the like vary for each user.

(Data Size-Based Management)

The narrowing-down operation number managing unit 115 may manage, for each data size of communication data, the number of operations of narrowing down candidate data for in-packet analysis based on each of the plurality of data aggregation methods. This is because a method to be selected by a user, the number of narrowing-down operations, and the like vary depending on data size.

(Data Characteristics-Based Management)

The narrowing-down operation number managing unit 115 may manage, for each type of data characteristics of communication data, the number of operations of narrowing down candidate data for in-packet analysis based on each of the plurality of data aggregation methods. This is because a method to be selected by a user, the number of narrowing-down operations, and the like vary depending on data characteristics, for example, the communication data is data obtained from the Internet, data obtained from a local area network, or the like.

(2) Determination of Second Data Aggregation Method Based on Number of Narrowing-Down Operations The determining unit 117 uses a learning result illustrated in FIG. 14 described above, to automatically determine an appropriate data aggregation method without being based on user operation. Concretely, the determining unit 117 selects, as the second data aggregation method, the data aggregation method having the largest number of operations of narrowing down candidate data for in-packet analysis, from among the plurality of data aggregation methods. Note that the determining unit 117 may select, as second data aggregation methods, the data aggregation methods having the largest to third largest numbers of narrowing-down operations, for example, without being limited to the data aggregation method having the largest number of operations of narrowing down candidate data for in-packet analysis.

In a case where the narrowing-down operation number managing unit 115 manages, for each user, the number of operations of narrowing down candidate data for in-packet analysis as described above, the determining unit 117 may determine, for each user, one or more second data aggregation methods, based on the number of operations of narrowing down candidate data for in-packet analysis, from among the plurality of data aggregation methods.

In a case where the narrowing-down operation number managing unit 115 manages, for each data size of communication data, the number of operations of narrowing down candidate data for in-packet analysis as described above, the determining unit 117 may determine, for each data size of communication data, one or more second data aggregation methods, based on the number of operations of narrowing down candidate data for in-packet analysis, from among the plurality of data aggregation methods.

In a case where the narrowing-down operation number managing unit 115 manages, for each type of data characteristics of communication data, the number of operations of narrowing down candidate data for in-packet analysis as described above, the determining unit 117 may determine, for each type of data characteristics of communication data, one or more second data aggregation methods, based on the number of operations of narrowing down candidate data for in-packet analysis, from among the plurality of data aggregation methods.

(3) Summary

As described above, according to the second example embodiment, by using a learning result obtained by user operation as that illustrated in FIG. 14 described above, an appropriate data aggregation method(s) is determined automatically without being based on user operation.

Note that restriction may be imposed on the determination of a data aggregation method by the determining unit 117, for example, the determination is performed only when the total number of narrowing-down operations managed in the narrowing-down operation number management table 1300 reaches a predetermined value or greater.

4. Third Example Embodiment

Next, a description will be given of a third example embodiment of the present invention with reference to FIG. 15. The above-described first and second example embodiments are concrete example embodiments, whereas the third example embodiment is a more generalized example embodiment.

4.1. Configuration of Data Aggregation Apparatus 500

Figure 15:
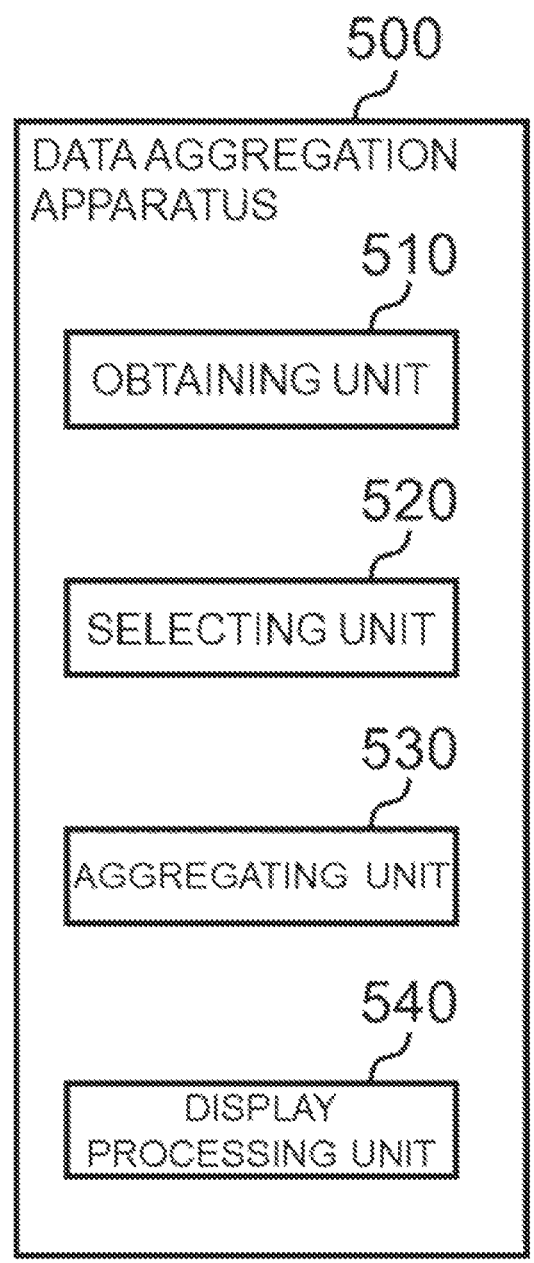
FIG. 15 is a block diagram illustrating an example of a schematic configuration of a data aggregation apparatus 500 according to a third example embodiment.

FIG. 15 is a block diagram illustrating an example of a schematic configuration of a data aggregation apparatus 500 according to the third example embodiment. With reference to FIG. 15, the data aggregation apparatus 500 includes an obtaining unit 510, a selecting unit 520, an aggregating unit 530, and a display processing unit 540.

The obtaining unit 510, the selecting unit 520, the aggregating unit 530, and the display processing unit 540 may be implemented with one or more processors, a memory (for example, a nonvolatile memory and/or a volatile memory), and/or a hard disk. The obtaining unit 510, the selecting unit 520, the aggregating unit 530, and the display processing unit 540 may be implemented with the same processor or may be implemented with separate processors. The memory may be included in the one or more processors or may be provided outside the one or more processors.

4.2. Operation Example

An operation example according to the third example embodiment will be described.

According to the third example embodiment, the data aggregation apparatus 500 (the obtaining unit 510) obtains communication data via a communication network. The data aggregation apparatus 500 (the selecting unit 520) selects one or more first data aggregation methods based on user operation from a plurality of data aggregation methods used to narrow down candidate data for in-packet analysis from the communication data. The data aggregation apparatus 500 (the aggregating unit 530) performs data aggregation of the communication data, based on the one or more first data aggregation methods. The data aggregation apparatus 500 (the display processing unit 540) displays, on a screen, an aggregated value related to the data aggregation.

Relationship with First Example Embodiment

As an example, the obtaining unit 510, the selecting unit 520, the aggregating unit 530, and the display processing unit 540 of the third example embodiment may perform respective operations of the obtaining unit 101, the selecting unit 103, the aggregating unit 107, and the display processing unit 109 of the first and second example embodiments. In this case, the descriptions of the first and second example embodiments may also be applicable to the third example embodiment.

Note that the third example embodiment is not limited to this example.

The third example embodiment has been described above. According to the third example embodiment, it is possible, for example, to perform data aggregation using an appropriate data aggregation method among a plurality of data aggregation methods used to narrow down candidate data for in-packet analysis from communication data.

5. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., the obtaining unit, the selecting unit, the aggregating unit, and/or the display processing unit) of the data aggregation apparatus described in the Specification (e.g., one or more apparatuses (or units) among a plurality of apparatuses (or units) constituting the data aggregation apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A data aggregation apparatus comprising:
an obtaining unit configured to obtain communication data via a communication network;
a selecting unit configured to select one or more first data aggregation methods based on user operation, from a plurality of data aggregation methods used to narrow down candidate data for in-packet analysis from the communication data;
an aggregating unit configured to perform data aggregation of the communication data, based on the one or more first data aggregation methods; and
a display processing unit configured to display, on a screen, an aggregated value related to the data aggregation.

(Supplementary Note 2)

The data aggregation apparatus according to supplementary note 1, wherein the display processing unit is configured to use a coordinate transformation function associated with the one or more first data aggregation methods, to transform coordinates on a screen to coordinates of the aggregated value related to the data aggregation.

(Supplementary Note 3)

The data aggregation apparatus according to supplementary note 1 or 2, wherein
the one or more first data aggregation methods are two or more first data aggregation methods, and
the display processing unit is configured to perform switching display of aggregated values related to two or more cases of data aggregation based on the two or more first data aggregation methods, to display the aggregated value for each of the first data aggregation methods in a switching manner.

(Supplementary Note 4)

The data aggregation apparatus according to any one of supplementary notes 1 to 3, wherein the display processing unit is configured to display a screen for encouraging user operation of narrowing down the aggregated value related to data aggregation, to an aggregated value range including candidate data for in-packet analysis.

(Supplementary Note 5)

The data aggregation apparatus according to any one of supplementary notes 1 to 4, further comprising
an in-packet analysis unit configured to perform in-packet analysis on candidate data for in-packet analysis included in an aggregated value range obtained by narrowing down based on the user operation, of the aggregated value related to the data aggregation.

(Supplementary Note 6)

The data aggregation apparatus according to supplementary note 5, further comprising;
a narrowing-down operation number managing unit configured to manage the number of narrowing-down operations of narrowing down candidate data for in-packet analysis based on data aggregation in each of the plurality of data aggregation methods; and
a determining unit configured to determine one or more second data aggregation methods, based on the number of narrowing-down operations, from among the plurality of data aggregation methods, wherein
the aggregating unit is configured to perform data aggregation of communication data, based on the one or more second data aggregation methods thus determined.

(Supplementary Note 7)

The data aggregation apparatus according to supplementary note 6, wherein the determining unit is configured to select, as the second data aggregation method, a data aggregation method having the largest number of narrowing-down operations, from among the plurality of data aggregation methods.

(Supplementary Note 8)

The data aggregation apparatus according to supplementary note 6 or 7, wherein the narrowing-down operation number managing unit is configured to manage, for each of two or more users, the number of narrowing-down operations of narrowing down candidate data for in-packet analysis based on data aggregation in each of the plurality of data aggregation methods, and the determining unit is configured to determine, for each user, one or more second data aggregation methods, based on the number of narrowing-down operations, from among the plurality of data aggregation methods.

(Supplementary Note 9)

The data aggregation apparatus according to supplementary note 6 or 7, wherein the narrowing-down operation number managing unit is configured to manage, for each data size of the communication data, the number of narrowing-down operations of narrowing down candidate data for in-packet analysis based on data aggregation in each of the plurality of data aggregation methods, and the determining unit is configured to determine, for each data size, one or more second data aggregation methods, based on the number of narrowing-down operations, from among the plurality of data aggregation methods.

(Supplementary Note 10)

The data aggregation apparatus according to supplementary note 6 or 7, wherein the narrowing-down operation number managing unit is configured to manage, for each type of data characteristics of the communication data, the number of narrowing-down operations of narrowing down candidate data for in-packet analysis based on data aggregation in each of the plurality of data aggregation methods, and the determining unit is configured to determine, for each type of data characteristics, one or more second data aggregation methods, based on the number of narrowing-down operations, from among the plurality of data aggregation methods.

(Supplementary Note 11)

A data aggregation method comprising:

obtaining communication data via a communication network;

selecting one or more first data aggregation methods based on user operation, from a plurality of data aggregation methods used to narrow down candidate data for in-packet analysis from the communication data;

performing data aggregation of the communication data, based on the one or more first data aggregation methods; and displaying, on a screen, an aggregated value related to the data aggregation.

(Supplementary Note 12)

A program for causing a processor to perform processing comprising:

obtaining communication data via a communication network;

selecting one or more first data aggregation methods based on user operation, from a plurality of data aggregation methods used to narrow down candidate data for in-packet analysis from the communication data;

performing data aggregation of the communication data, based on the one or more first data aggregation methods; and displaying, on a screen, an aggregated value related to the data aggregation.

This application claims priority based on JP 2019-199697 filed on Nov. 1, 2019, the entire disclosure of which is incorporated herein.

INDUSTRIAL APPLICABILITY

It is possible to perform data aggregation using an appropriate data aggregation method among a plurality of data aggregation methods used to narrow down candidate data for in-packet analysis from communication data.

REFERENCE SIGNS LIST

100, 200, 500 Data Aggregation Apparatus
101, 510 Obtaining Unit
103, 520 Selecting Unit
105 Data Aggregation Method Table
107, 530 Aggregating Unit
109, 540 Display Processing Unit
111 Range Narrowing-down Unit
113 In-packet Analysis Unit
115 Narrowing-down Operation Number Managing Unit
117 Determining Unit

What is claimed is:

1. A data aggregation apparatus comprising:
a memory storing instructions; and
one or more processors configured to execute the instructions to:
perform a plurality of times a first process of:
obtaining first communication data via a communication network;
displaying a list of available data aggregation methods to narrow down communication data on which in-packet analysis is to be performed, the available data aggregation methods including:
a first available method in which the communication data is narrowed down based on a number of packets transmitted on a per-minute basis;
a second available method in which the communication data is narrowed down based on a number of different source network addresses in the packets on the per-minute basis;
a third available method in which the communication data is narrowed down based on a specified number of destination port numbers for which there are a greatest number of packets;
a fourth available method in which the communication data is narrowed down based on a specified number of the destination port numbers for which there are a smallest number of packets;
receiving user selection of a first data aggregation method from the displayed list of the available data aggregation methods;
narrowing down the first communication data by performing the first data aggregation method;
displaying, as an aggregation result, the narrowed-down first communication data;
performing the in-packet analysis on the narrowed-down first communication data; and
incrementing a number of times the first data aggregation method has been selected by the user;

after the first process has been performed the plurality of times, perform a second process of:
  obtaining second communication data via the communication network;
  selecting, as a second data aggregation method, the available data aggregation method that has been selected as the first data aggregation method in the plurality of times the first process was performed;
  narrowing down the second communication data by performing the second data aggregation method to narrow down the second communication data;
  performing the in-packet analysis on the narrowed-down second communication data; and
  identifying, based on a result of the in-packet analysis that has been performed, whether or not the narrowed-down second communication data includes malicious data.

2. The data aggregation apparatus according to claim 1, wherein the one or more processors are configured to execute the instructions to use a coordinate transformation function associated with the first data aggregation method, to transform coordinates on a screen to coordinates of the narrowed-down first communication data.

3. The data aggregation apparatus according to claim 1, wherein the one or more processors are configured to execute the instructions to display a screen for encouraging the user selection of the first data aggregation method to narrow down the first communication data to an aggregated value range including candidate data for the in-packet analysis.

4. A data aggregation method performed by a computer and comprising:
  performing a plurality of times a first process of:
    obtaining first communication data via a communication network;
    displaying a list of available data aggregation methods to narrow down communication data on which in-packet analysis is to be performed, the available data aggregation methods including:
      a first available method in which the communication data is narrowed down based on a number of packets transmitted on a per-minute basis;
      a second available method in which the communication data is narrowed down based on a number of different source network addresses in the packets on the per-minute basis;
      a third available method in which the communication data is narrowed down based on a specified number of destination port numbers for which there are a greatest number of packets;
      a fourth available method in which the communication data is narrowed down based on a specified number of the destination port numbers for which there are a smallest number of packets;
    receiving user selection of a first data aggregation method from the displayed list of the available data aggregation methods;
    narrowing down the first communication data by performing the first data aggregation method;
    displaying, as an aggregation result, the narrowed-down first communication data;
    performing the in-packet analysis on the narrowed-down first communication data; and
    incrementing a number of times the first data aggregation method has been selected by the user;
  after the first process has been performed the plurality of times, performing a second process of:
    obtaining second communication data via the communication network;
    selecting, as a second data aggregation method, the available data aggregation method that has been selected as the first data aggregation method in the plurality of times the first process was performed;
    narrowing down the second communication data by performing the second data aggregation method to narrow down the second communication data;
    performing the in-packet analysis on the narrowed-down second communication data; and
    identifying, based on a result of the in-packet analysis that has been performed, whether or not the narrowed-down second communication data includes malicious data.

5. A non-transitory computer readable recording medium storing a program for causing a processor to perform processing comprising:
  performing a plurality of times a first process of:
    obtaining first communication data via a communication network;
    displaying a list of available data aggregation methods to narrow down communication data on which in-packet analysis is to be performed, the available data aggregation methods including:
      a first available method in which the communication data is narrowed down based on a number of packets transmitted on a per-minute basis;
      a second available method in which the communication data is narrowed down based on a number of different source network addresses in the packets on the per-minute basis;
      a third available method in which the communication data is narrowed down based on a specified number of destination port numbers for which there are a greatest number of packets;
      a fourth available method in which the communication data is narrowed down based on a specified number of the destination port numbers for which there are a smallest number of packets;
    receiving user selection of a first data aggregation method from the displayed list of the available data aggregation methods;
    narrowing down the first communication data by performing the first data aggregation method;
    displaying, as an aggregation result, the narrowed-down first communication data;
    performing the in-packet analysis on the narrowed-down first communication data; and
    incrementing a number of times the first data aggregation method has been selected by the user;
  after the first process has been performed the plurality of times, performing a second process of:
    obtaining second communication data via the communication network;
    selecting, as a second data aggregation method, the available data aggregation method that has been selected as the first data aggregation method in the plurality of times the first process was performed;
    narrowing down the second communication data by performing the second data aggregation method to narrow down the second communication data;
    performing the in-packet analysis on the narrowed-down second communication data; and identifying, based on a result of the in-packet analysis that has been performed, whether or not the narrowed-down second communication data includes malicious data.

\* \* \* \* \*